United States Patent [19]
McNeil et al.

[11] 4,214,551
[45] Jul. 29, 1980

[54] FISH EGG SUPPORTING SYSTEM

[75] Inventors: William J. McNeil; Richard F. Severson, both of Eugene, Oreg.

[73] Assignee: Oregon Aqua-Foods, Inc., Springfield, Oreg.

[21] Appl. No.: 922,884

[22] Filed: Jul. 10, 1978

[51] Int. Cl.² ............................................. A01K 61/00
[52] U.S. Cl. ...................................................... 119/3
[58] Field of Search ............ 119/3; 211/14; 229/6 A, 229/12.5 EC

[56] References Cited

U.S. PATENT DOCUMENTS

| | | | |
|---|---|---|---|
| 3,028,837 | 4/1962 | Tuttle | 119/3 |
| 3,886,905 | 6/1975 | McNeil | 119/3 |
| 4,094,270 | 6/1978 | Whitlock | 119/3 |

*Primary Examiner*—Louis G. Mancene
*Assistant Examiner*—Robert P. Swiatek

[57] ABSTRACT

A system for supporting fish eggs including a waffle-patterned surface providing individual fish egg supporting apertures. The apertures are in a noncircular form to permit the flow of fluids and gases around the egg supported in each aperture. The apertures are spaced from one another a distance to permit the eggs resting in adjacent apertures to have a gap therebetween to prevent the fungus that might form on a dead egg in one aperture from spreading to an adjacent viable egg resting in the next aperture. The system can include stackable trays which permit numerous eggs to be held in a small volume. The apertures are of sufficient similarity in surface configuration to natural gravel beds to support the alevin in comfort to encourage maximum conversion of the egg yolk to fish tissue rather than wasting such nourishment on motion. The trays can be stacked within a raceway with a porous membrane upstream of and adjacent to the stacked trays to distribute the flowing water evenly throughout the stack.

4 Claims, 5 Drawing Figures

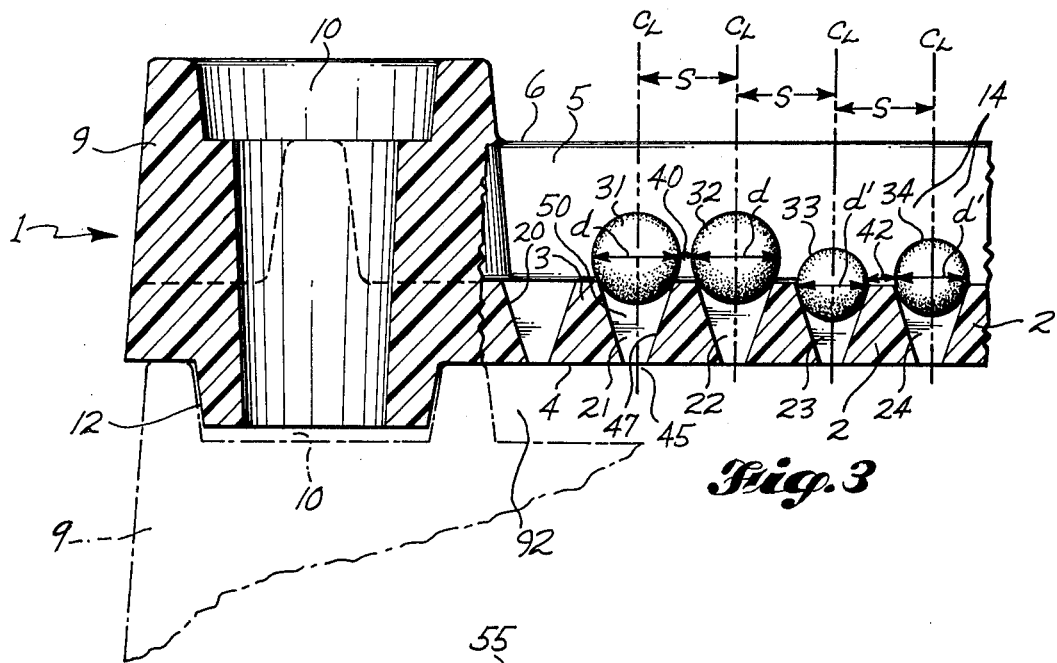
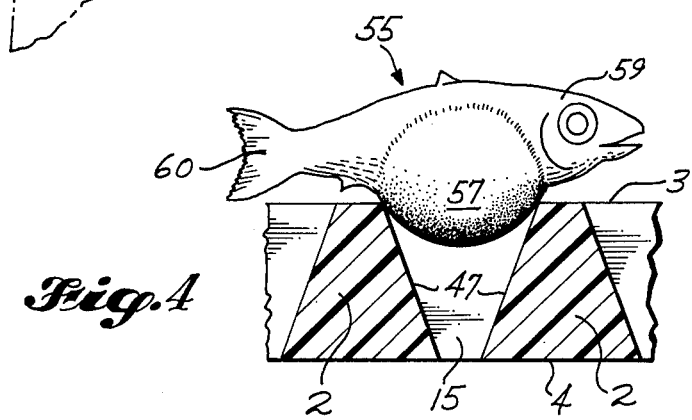
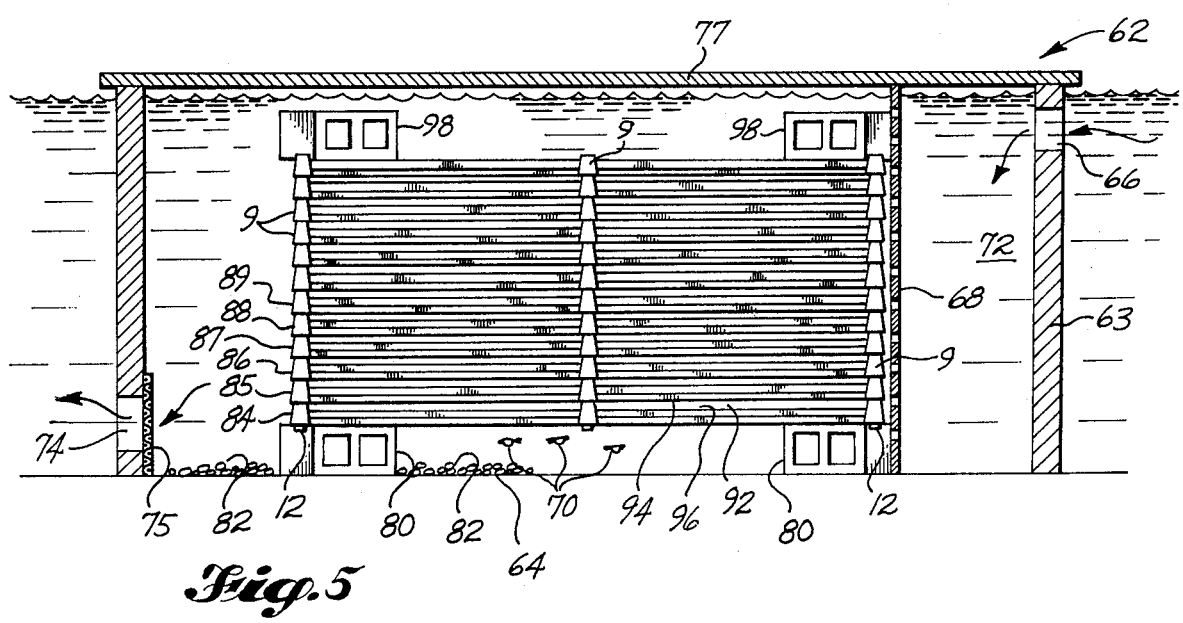

FISH EGG SUPPORTING SYSTEM

BACKGROUND AND BRIEF SUMMARY OF THE INVENTION

This invention relates to improvements in fish egg incubation systems.

After fish eggs have been gathered from the mother fish and fertilized, they must be carefully handled in order to obtain a high-survival rate of fish from the initial eggs. During the formation stages, the eggs need to be in a protective environment where they will not be eaten by adult fish or damaged by rough movement and will have sufficient oxygen and moisture to support their continued life. When one egg dies, a fungus is often formed on it which, if permitted to spread to other eggs, will block the passage of necessary gases to the surface of the eggs and they, too, will die.

Many systems have been developed for providing a desired environmental for fish eggs during their early stages of formation. In the U.S. patent to Martinez No. 3,464,387, there is provided a fish breeder having a chamber wherein the mother fish is permitted to give birth and a second chamber into which the baby fish can swim through a partition separating the two chambers. The separation partition has adjustable positions to permit in one position the baby fish to enter into the safe chamber to avoid the danger of being eaten by the mother fish. With an adjustment in the partition to a second position, the baby fish is prevented from reentering the first chamber.

The U.S. patent to Stasio No. 3,693,591, discloses a fish breeder system which floats within a fish aquarium. This system includes a device which provides a nesting tray below a frame and a series of small chambers located above it with small apertures communicating between the region of the nesting tray and the small chambers. The newborn fish escape from the nesting tray and the adult fish by entering into the upper chambers through the small apertures which are designed to provide easy access into the chamber but difficult exit of the small fish back out of the safe chambers.

The fish breeder shown in the Freudenberger U.S. Pat. No. 3,374,770 is formed from a large molded plastic box having perforated walls which permit the flow of water into the chamber from the aquarium and provide a safe cage for the small fish until they are of a large enough size to be released from the breeder.

More elaborate spawning trays and fish egg incubators have been developed for providing suitable environments for the formation of eggs into alevins. In the U.S. patent to Brittain et al No. 3,024,764, there is disclosed a fish tray system which includes a screen egg holder cartridge for holding up to 8,000 individual eggs. The egg holding cartridge is placed within a tray and the trays are stacked to permit the flow of water from one tray to the screen and then on to the next lower tray. The cartridge provides a means for holding the eggs during incubation stage and in subsequent fry culture stages. The entire cartridge can be detached from the incubation hatchery tray to float in a rearing pond while protecting the fry from predatory attack. There is no disclosure, however, that the individual eggs are separated from one another during the incubation stage.

A somewhat similar tray system is described in the U.S. patent to Tuttle No. 3,028,837 which includes a mesh screen upon which are distributed a plurality of eggs to be hatched. In a similar manner, the U.S. patent to Reynolds No. 3,738,317 utilizes a screened holder having a chamber for holding the eggs between two screens during the incubation of the eggs. This screen may be a fine mesh fabric or semi-rigid fiberglass material which will provide little obstruction to water flow.

One solution for the fungus problem is that set forth in the Reynolds U.S. Pat. No. 3,738,317 wherein the water utilized in the system is subjected to ultraviolet rays to kill inhibiting fungus.

It is known in the poultry industry to provide stackable trays for holding incubating eggs with each tray having individual egg supporting chambers and thin members extending up from the tray to prevent the falling of the egg in one aperture against the egg in an adjacent aperture as the trays are moved from a horizontal to inclined position. Such a tray system is shown in the U.S. patent to Theilig No. 3,147,737.

Perhaps the most pertinent prior system is disclosed in the U.S. patent to Salter No. 4,014,293. As shown, a fish egg incubator includes an upper screen tray for supporting the eggs. When the eggs hatch out, the alevins fall through the mesh in the screen to a rugose substrate where the alevins reside as they continue their development to the fry stage. The egg supporting screen and the rugose layer are provided within a tray system in which circulated water provides the protective atmosphere for the growth processes to be successful. This system is somewhat complicated, however, by having numerous individual parts which must be carefully manufactured in view of the necessary clearances.

None of the above-mentioned patents, however, disclose the provision of a quiet environment to permit fish eggs to rest during the formation of the alevin without contacting one another to prevent the spread of fungus and to provide a nearly stationary position for the alevin during its conversion from yoke to fish tissue without wasting nutrition on movement.

Among the objects of the present invention are to provide a simple system for supporting fertilized fish eggs during their development to viable fry; to minimize the loss due to spreading fungus; and to minimize the loss of conversion of yoke to body tissue due to unnecessary activity of the alevins.

It is another object of this invention to provide a supporting system for developing fish eggs which can be used in rearing ponds from the very outset without the need for a separate hatchery facility and without the need for changing the location of the egg from the time it is first placed into the system for incubation to the time that the alevins have matured into viable fry.

SUMMARY OF THE INVENTION

In accordance with the present invention, there is provided a suitable fish egg supporting surface which may be in the form of a large sheet or tray or movable belt. This surface is formed in a waffle pattern to provide a number of depressed egg holding chambers or apertures which are spaced from one another a distance which will present the egg in one chamber from contacting the egg in the adjacent chamber. The apertures include a noncircular supporting system for contacting the egg in a manner which will permit the flow of gases and fluids up and around the egg even though it is held within the aperture. The aperture may also be formed such that the fluids and gases will pass through an opening in the aperture which extends from the upper to lower surface of the supporting member. This opening is of a small enough dimension which will prevent alevins from passing through the opening.

The supporting trays may be formed with sufficient rigidity and include stacking elements to permit one tray to be stacked above others while still providing sufficient circulation of fluids and gases in and around the eggs in the tray and without contacting the eggs other than by the noncontinuous edges of the supporting aperture. With this system the eggs have a gap between them which prevents the spread of fungus from one egg to an adjacent egg. The apertures also provide a suitable, comfortable environment for the alevins which will permit them to rest with their yolk stomach portion supported in the aperture while the alevin converts the yolk to fish tissue with a minimum amount of movement. When the yolk has been sufficiently utilized and the alevin becomes long and thin, it can then easily leave the aperture area and escape into the environment around the trays. The trays can be placed in a raceway or in a special hatchery environment if such is desired.

DESCRIPTION OF THE DRAWINGS

FIG. 3 shows a cross section view of the tray portion shown in FIG. 2.

FIG. 4 shows a cross section view of a single tray supporting aperture wherein an alevin is resting.

FIG. 5 is a cross section view showing a stack of trays within a raceway.

DESCRIPTION OF THE PREFERRED EMBODIMENTS

Figure 1:
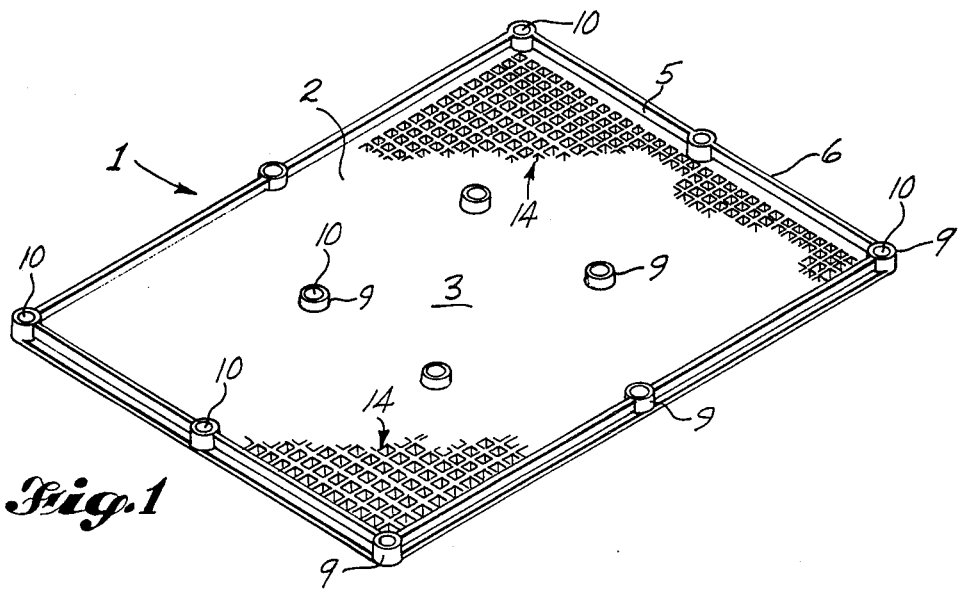
FIG. 1 is an isometric view of one embodiment of the fish egg support tray.

In the embodiment shown in FIG. 1, support tray 1 is formed with a large upper surface 3 having extending therearound a perimeter rim formed of a ridge member 5 extending upwardly from the upper surface 3 with a rim edge 6 forming the uppermost surface of the support tray 1. In the center, at the corners and along the rim 6 are located stacking elements 9 including a female socket 10 formed in the upper surface of the stacking element 9 and a male projection or foot member 12 which is of a size for inserting into the female socket 10 of the next lower tray if the trays are stacked or otherwise providing the lowermost supply for the tray. A plurality of egg supporting apertures 14 form a waffle pattern in the upper surface 3 of the support tray 1.

Support tray 1 has a web member 2 extending between the perimeter rim 5 with an upper surface 3 and a lower surface 4 defining the web member 2.

Figure 2:
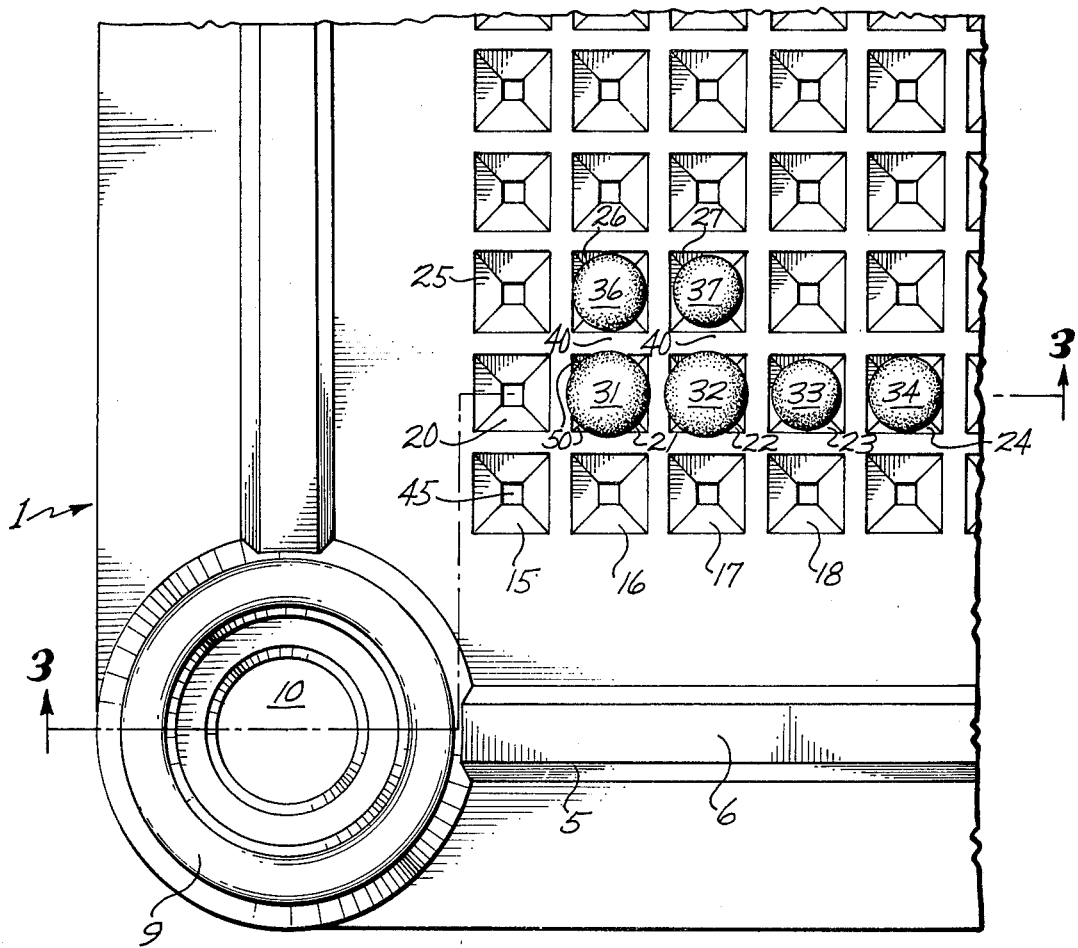
FIG. 2 shows a plan view, a portion of the surface of the tray, the details of the egg supporting apertures and stacking element.

As shown in FIGS. 2 and 3, fish eggs 31 to 37 rest in apertures generally referred to as 14 such that the diameter of the eggs d is less than the spacing S between the center lines of adjacent apertures, such as 21 and 22, to provide a gap 40 between adjacent eggs 31 and 32. Since the diameter d' of the smaller eggs 33 and 34 is smaller and the center line distance S between the center line of adjacent apertures 23 and 24 is the same, there is a larger gap 42 formed between the eggs 33 and 34. A similar gap 40 exits between eggs 36 and 31 and 37 and 32 because of the similar spacing of the center lines between apertures 26 and 21 and 27 and 22.

The gaps 40 and 42 between adjacent eggs provide a means for insulating the one egg which might have a fungus formed on it from attaching itself to the next adjacent egg. Such fungus attachment would, if present, cut off the flow of fluids and gases to the live egg and eventually cause it to die.

In more detail, aperture 21 is formed in web member 2 with a noncircular cross section and includes a bottom opening 45 permitting the flow of fluid from the lower surface 4 up through the opening 45 through the aperture 21 beyond the upper surface 3 of the web member 2. Aperture 21 is formed with sloping side walls 47 to form a truncated cone with the larger portion emerging from surface 3 and the lower portion emerging from surface 4 through bottom opening 45. As shown, the side walls 47 form aperture 21 with a square cross section. Since the square cross section is noncircular, there are provided passageways 50 as the edges of the side walls 47 join to permit the passageway of gases and liquids around the circular surface of the egg, such as egg 31. The provision of the slanting side walls 47 permits various sizes of eggs such as the large egg 31 and the smaller egg 33 to be held in the apertures 21 and 23 and thus the tray 1 is suitable for holding different sized eggs and still providing the passageways 50 and the noncontacting gaps 40 and 42 between adjacent eggs.

With reference to FIG. 4, there is shown alevin 55 which has hatched from an egg and still retains the large egg-shaped yolk 57 but includes an eyed head 59 and a tail section 60. Alevin 55 is satisfied to rest without movement in the aperture 15 being supported by the side walls 47. In this position the yolk 57 is consumed and converted into body tissue by the alevin 55 with little loss of nutrient caused by unnecessary movement.

With reference to FIG. 5, there is shown a cross section of a raceway or rearing pond 62 which is formed with side walls 63, bottom wall 64 and equipped with an intake 66 for water 72 which passes through a suitable porous membrane such as screen 68. The screen 68 is adjacent to the stack of trays 84–89 and the pressure head through the screen 68 causes the water 72 to evenly circulate through the trays 84–89. In addition, screen 68 prevents the passage of released alevin. Water 72 exits through water outlet 74 which also includes an outlet screen 75. Raceway 62 may be covered by an appropriate light-shielding cover 77 which prevents light from bothering the alevin during their incubation.

Within raceway 62 are placed support blocks 80 resting on the bottom wall 64. Also to provide a quiet area for the free alevin 70, there may be placed plastic rings or other uneven gravel-like items supported by bottom wall 64 to form a rugose surface 82 similar to the gravel in the bottom of a river. Supported on blocks 80 are individual trays 84 through 89, stacked with the male projections 12 of the stacking elements 9 inserted into the female sockets 10. A vertical gap 92 exists between the upper edge 96 of tray 84 and the lower surface 94 of the next upper tray 85. In the preferred embodiment the gap 92 is less than the diameter of the yoke 57 to prevent the escape of alevin 55 until it is long and thin after consuming the yoke nutrients. Gap 92 must provide sufficient flow of water 72 between the trays 84 and 85. Blocks 98 add weight to the trays 84–89 to prevent them from floating.

OPERATION

After the fish eggs have been gathered from their mother, they are fertilized and spread along the upper surface 3 of the support tray 1 such that there is no more than one egg in each of the apertures 14 and the eggs are uniformly spaced throughout the upper surface 3 of the tray. In the preferred embodiment over 12,000 apertures are formed in each tray and this is approximately equal to the egg yield of three or four mature salmon. The tray is approximately 35"×46" with the spacing S between center lines of adjacent apertures such as 21 and 22, 0.33". The web member 2 has a thickness of 0.25" with the maximum opening between the upper edges of side walls 47 being 0.25" and the bottom opening 45 has a cross section of 0.06". Thus eggs having a diameter of less than 0.33" can be placed in the apertures with an appropriate gap 40 between them.

Once a tray is filled with sufficient eggs distributed uniformly across it, the tray can be stacked as shown in FIG. 5 with additional trays having additional eggs spaced uniformly over their surfaces. The trays are stacked close to screen 68 to provide uniform flow of water through the trays. Blocks 98 are added to the tray to prevent floating. The raceway 12 is then covered by cover 77 to keep light out. The water 72 is permitted to pass into the raceway throughout inlet 66 and screen 68, circulate uniformly around the stack of trays 84 through 89 to provide the desired environment with the water passing up through the passageways 50 formed between the square cross section of the apertures 14 and the round surfaces of the eggs to provide a good flow to permit the gas exchange and the removal of metabolic waste. The water 72 then passes through the outlet 74 and screen 75.

After the eggs have been in the trays for a sufficient number of days, such as three or four weeks, the alevin 55 will hatch from the egg. Because of their comfort in the apertures 14, the alevins will tend to stay within the apertures 14 until they have sufficiently converted the nutrients in the yolk 57 into body tissue. As the yolk is reduced, a larger head 59 and tail section 60 are formed to produce a slender alevin. At this stage the alevin can then escape from the tray through gap 92 formed between the upper edge of the lower tray 84 and the lower surface 94 of the next adjacent upper tray 85. The alevin may then decide to rest upon the rugose bottom 82 formed on the bottom surface 64 of the raceway 62. The bulk of the alevin, however, will maintain their residence within the protection of the trays until the cover 77 is removed and the trays are unstacked. This yields, in recent experience, 95% of the initial eggs as viable alevin. The fungus attaching itself to dead eggs is removed as the trays are removed from the raceway.

The waffle surface formed in the web member 2 of the support tray could be formed in a belt or in smaller trays, in circular trays, or any other suitable medium for providing the support for the eggs through the incubation and formation of the alevin stages. The support trays 1 could be used along with the individual tray stacking system such as shown in the U.S. patent to Brittain et al No. 3,024,764 in a hatchery room and then removed to a raceway at a later date. However, in the preferred form the whole operation after the fertilization of the egg to the point where the alevin are free to seek other nourishment can take place in a single raceway with only one process of handling the eggs and trays.

What is claimed is:

1. A system for supporting fish eggs comprising:
   a supporting member having upper and lower surfaces;
   said upper surfaces formed with perforations to define a waffle pattern of egg supporting apertures;
   said apertures including egg contacting means for discontinuously engaging a portion of an egg's surface and permitting the flow of gases and fluids within said aperture and around said egg through the passageways between said discontinuous engagement of said egg by said contacting means;
   each of said apertures being sized to retain only one egg;
   said apertures being spaced a distance from one another to maintain a gap between eggs supported in adjacent apertures; and
   said apertures each define an opening from said upper surface to said lower surface of a size large enough to permit the flow of gases and fluid but small enough to prevent the passage of alevin through said opening.

2. The system of claim 1 wherein:
   said supporting member further comprises a tray having stacking elements extending above and below said upper and lower surfaces; and
   said system includes a series of said trays horizontally extending and vertically stacked within a water raceway with a gap established between adjacent trays by the engagement of said stacking elements.

3. The system of claim 2 wherein:
   said raceway includes a porous membrane positioned upstream and adjacent to one edge of said stack of trays to circulate the water in said raceway evenly through said stack of trays.

4. The system of claim 1 wherein:
   said egg contacting means is formed by a plurality of side walls which slope to form a truncated cone with the larger portion emerging from said upper surface to provide noncontinuous support for eggs having a range of diameters.

* * * * *